US008769585B2

(12) United States Patent
Mallian et al.

(10) Patent No.: US 8,769,585 B2
(45) Date of Patent: Jul. 1, 2014

(54) SYSTEMS AND METHODS OF PROCESSING PROGRAMMING WISH LIST DATA

(75) Inventors: Dolores Mallian, St. Charles, IL (US);
Bruce Barnes, Crystal Lake, IL (US);
Shadi Khoshaba, Skokie, IL (US);
Wayne Heinmiller, Elgin, IL (US);
Henry Towster, Barrington, IL (US);
Charles Stahulak, Chicago, IL (US);
Nikhil Marathe, Chicago, IL (US)

(73) Assignee: AT&T Knowledge Ventures, LP, Reno, NV (US)

( * ) Notice: Subject to any disclaimer, the term of this patent is extended or adjusted under 35 U.S.C. 154(b) by 1672 days.

(21) Appl. No.: 11/863,843

(22) Filed: Sep. 28, 2007

(65) Prior Publication Data

US 2009/0089839 A1    Apr. 2, 2009

(51) Int. Cl.
| G06F 3/00 | (2006.01) |
| G06F 13/00 | (2006.01) |
| H04N 5/445 | (2011.01) |
| H04N 7/16 | (2011.01) |
| H04H 60/33 | (2008.01) |
| H04N 7/173 | (2011.01) |
| H04N 21/258 | (2011.01) |
| H04N 21/442 | (2011.01) |

(52) U.S. Cl.
CPC ....... *H04N 21/258* (2013.01); *H04N 21/25883* (2013.01); *H04N 21/442* (2013.01)
USPC .................. 725/61; 725/13; 725/86; 725/121

(58) Field of Classification Search
CPC ............ H04N 21/25; H04N 21/25883; H04N 21/442; H04N 21/472
See application file for complete search history.

(56) References Cited

U.S. PATENT DOCUMENTS

| 5,635,989 | A | * | 6/1997 | Rothmuller | 725/46 |
| 7,370,343 | B1 | * | 5/2008 | Ellis | 725/58 |
| 2002/0047894 | A1 | * | 4/2002 | Steading et al. | 348/44 |
| 2002/0152458 | A1 | * | 10/2002 | Eyer et al. | 725/1 |
| 2002/0194598 | A1 | * | 12/2002 | Connelly | 725/39 |
| 2003/0028884 | A1 | * | 2/2003 | Swart et al. | 725/51 |
| 2003/0041327 | A1 | | 2/2003 | Newton et al. | |
| 2004/0013409 | A1 | * | 1/2004 | Beach et al. | 386/83 |
| 2007/0174471 | A1 | | 7/2007 | Van Rossum | |
| 2007/0204299 | A1 | * | 8/2007 | Vosseller | 725/46 |
| 2008/0313670 | A1 | * | 12/2008 | Ho et al. | 725/34 |

OTHER PUBLICATIONS

"TiVo", definition from Wikipedia, the free encyclopedia, 14 pages, retrieved from the Internet: http://en.wikipedia.org/wiki,TiVo, on Sep. 3, 2007.

(Continued)

*Primary Examiner* — Mark D Featherstone
(74) *Attorney, Agent, or Firm* — Toler Law Group, PC

(57) ABSTRACT

Systems and methods to process program wish list data are provided. A system includes a media receiver adapted to receive media content from a media distribution system and a recording module responsive to the media receiver. The system also includes a program guide module to receive a published program guide identifying media content available to be distributed via the media distribution system. The system further includes a wish list module to generate wish list data including identifying information associated with at least one program. The at least one program is not listed in the published program guide when the wish list data is generated. The system also includes a reporting module to report information related to the wish list data to a remote network element.

21 Claims, 6 Drawing Sheets

(56) References Cited

OTHER PUBLICATIONS

"TVPredictions.com Forum", 11 pages, retrieved from the Internet http://www.tvpredictions.com/forum/comments.php?y=07&m=03&entry=entry070319-154, on Sep. 3, 2007.

"TiVo WhishList", 11 pages, retrieved from the Internet: http://www.tivo.com/whatistivo/tivofeatures/wishlist/index.html, on Sep. 3, 2007.

"Archive for the TiVo' Category", 5 pages, retrieved from the Internet http://geeksrus.com/category/tivo/, on Sep. 3, 2007.

"Less Than $50 This Holiday Season and Loaded With New Features, the TiVo Box Is the Gift Everyone Will Love to Give as Much as Receive", 3 pages, retrieved from the Internet http://investor.tivo.com/ReleaseDetail.cfm?ReleaseID=181425, on Sep. 3, 2007.

* cited by examiner

SYSTEMS AND METHODS OF PROCESSING PROGRAMMING WISH LIST DATA

FIELD OF THE DISCLOSURE

The present disclosure is generally related to processing program wish list data.

BACKGROUND

Personal media recorders, such as digital video recorders (DVRs) may be popular partly because they allow users to view programs they would not otherwise be able to see, for example, due to schedule conflicts. Many personal media recorders allow users to schedule recording of particular programs using an electronic program guide. However, if a user desires to record a program that is not available in the electronic program guide, the user's options may be limited. For example, the user may have to search the electronic program guide periodically to determine whether the desired program is available.

DETAILED DESCRIPTION OF THE DRAWINGS

A system to process program wish list data is provided that includes a media receiver adapted to receive media content from a media distribution system and a recording module responsive to the media receiver. The system also includes a program guide module to receive a published program guide identifying media content available to be distributed via the media distribution system. The system further includes a wish list module to generate wish list data including identifying information associated with at least one program. The at least one program is not listed in the published program guide when the wish list data is generated. The system also includes a reporting module to report information related to the wish list data to a remote network element.

A system to process program wish list data is provided that includes a network interface to receive wish list data from a plurality of users of a media distribution system. The system also includes a data analysis module to analyze wish list data associated with programs that are not scheduled for transmission based on a published program guide available to the plurality of users and to estimate viewer interest in at least one program based on the wish list data.

A method of processing program wish list data is provided that includes receiving input including content descriptive information to form a search query. The method also includes generating a display including search results related to the content descriptive information. The search results identify at least one unscheduled program. The method further includes generating a wish list related to the at least one unscheduled program. The method also includes sending information related to the wish list to a remote network element to be analyzed with respect to a wish list from at least one other user. A processor-readable medium including processor-readable instructions executable by a processor to implement the method is also provided.

A method of processing program wish list data is provided that includes receiving wish list data from a plurality of users of a media distribution system. The wish list data identifies programs that are not scheduled for transmission based on a published program guide available to the plurality of users. The method also includes determining viewer interest in at least one program based on the wish list data. A processor-readable medium including processor-readable instructions executable by a processor to implement the method is also provided.

Figure 1:
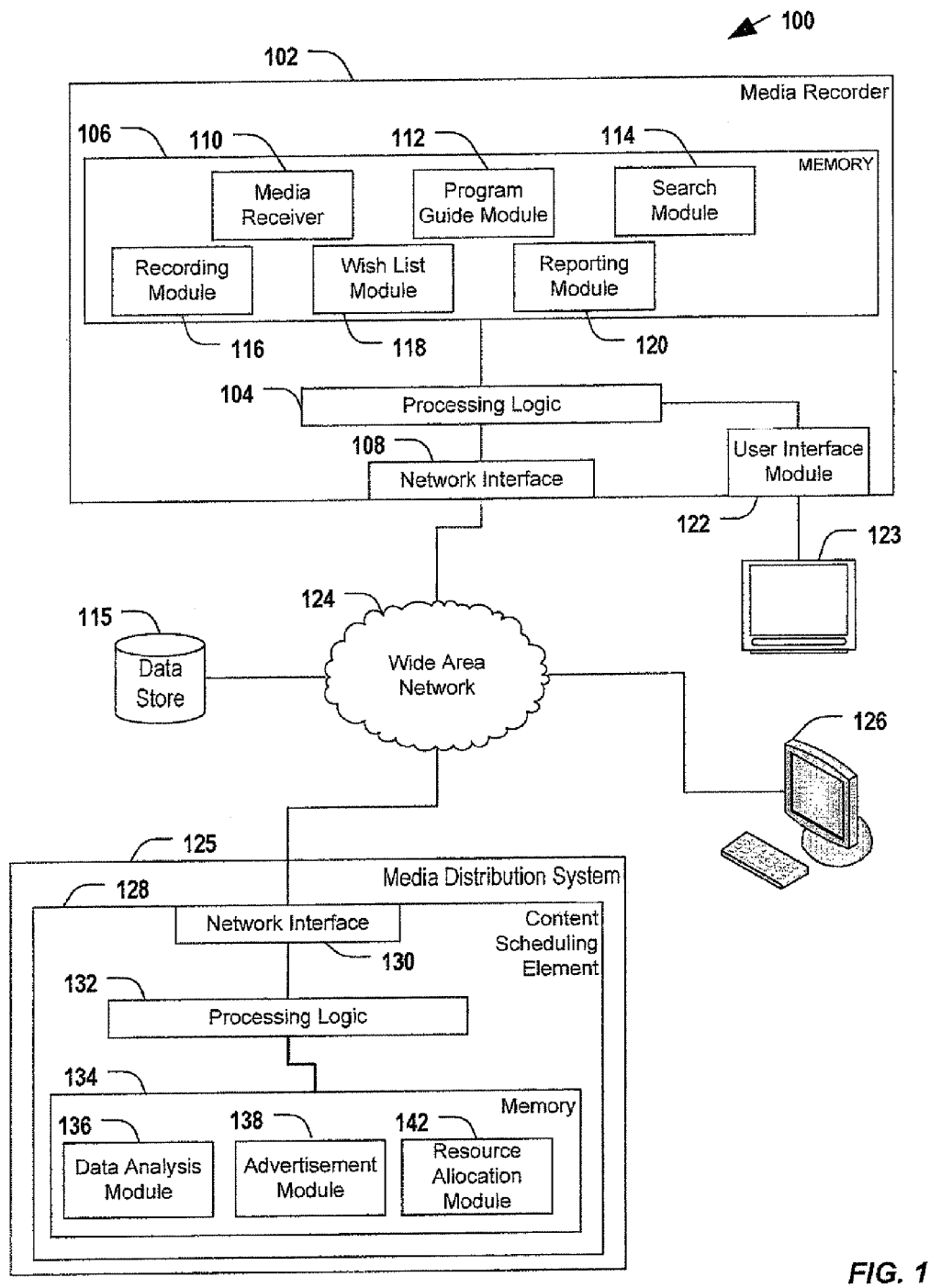
FIG. 1 is a diagram of a particular embodiment of a system to process program wish list data.

FIG. 1 depicts a first particular embodiment of a system to process program wish list data, generally designated 100. The system 100 includes a media recorder 102 adapted to communicate via a wide area network 124 with a media distribution system 125. In a particular embodiment, the media distribution system 125 may include an Internet Protocol Television (IPTV) system, a cable television system, a satellite television system, another media distribution system, or any combination thereof. The system 100 also includes a user computer 126 which may communicate via the wide area network 124 with the media distribution system 125, the media recorder 102, or both.

In a particular embodiment, the media recorder 102 may include a set-top box device adapted to record media, such as a digital video recorder, an IPTV set-top box device, a video gaming device or console, a personal computer or other computing device, any other device adapted to receive and record media content or any combination thereof. In another particular embodiment, the media recorder 102 or portions of the media recorder 102 may be located remotely from the user. For example, the media recorder 102 may include a network-based media recorder device. The media recorder 102 includes processing logic 104 and a memory 106 accessible to the processing logic 104. The media recorder 102 also includes a network interface 108 accessible to the processing logic 104. The network interface 108 is adapted to facilitate communications between the media recorder 102 and one or more other devices via the wide area network 124. The media recorder 102 also includes a user interface module 122. The user interface module 122 is adapted to generate a display at a display device 123, such as a television. The user interface module 122 is also adapted to receive input from a user, e.g., via a remote control device.

The memory 106 can include one or more modules 110-120, each adapted to implement one or more functions of the media recorder 102. For example, the modules may include a media receiver module 110, a program guide module 112, a search module 114, a recording module 116, a wish list module 118, a reporting module 120, and other modules as may be appropriate to perform the functions of the media recorder 102. The modules 110-120 can include, for example, instructions executable by the processing logic 104, such as instructions included in one or more software applications or other computer programs. In an alternative embodiment, the modules 110-120 can include hardware logic, executable instructions, or any combination thereof. The memory 106 can include a single memory device or distributed memory resources.

The media receiver module 110 may be adapted to receive media content from the media distribution system 125 via the wide area network 124 and process the media content for display at the display device 123. In a particular embodiment, the media receiver module 110 may include an IPTV decoder, a cable television decoder, a broadcast television tuner, any other media receiver, or any combination thereof The recording module 116 may be adapted to store received media content at the memory 106 or at another memory device. The recording module 116 may also be adapted to schedule recording of media content based on user provided input and configuration information. For example, the recording module 116 may record a user selected program or a selected series of programs.

In a particular embodiment the program guide module 112 is adapted to display a user interface including an electronic program guide. The electronic program guide may include a published listing of programs available for display or recording. In a particular embodiment, the electronic program guide is based on information published by a content provider or by the media distribution system 125. The program guide module 112 may interact with the recording module 116 to schedule recording of programs. For example, a user may select a particular program via the electronic program guide display generated by the program guide module 112 and the user may indicate a desire to record the particular program. The recording module 116 may schedule a recording of the program based on the user provided input.

The wish list module 118 provides another mechanism by which the user may request recording of a program. The wish list module 118 may allow a user to request recording of a program that is not found within the electronic program guide available to the user via the program guide module 112. For example, the user may interact with the search module 114 via the user interface module 122 to indicate a desire to search for a particular program. The search module 114 may be executable by the processing logic 104 to display a search interface at the display device 123. The user may input content descriptive information via the search interface to form a search query. The content descriptive information may include, for example, a title of a program, names of one or more people associated with the program (e.g., actors, directors, producers), text descriptive of the program (e.g., subject matter of the program, plot elements, awards received, genre, year of release), other content descriptive information, or any combination thereof. The search module 114 may search the electronic program guide to identify content consistent with the search query. Additionally, the search module 114 sends the search query via the wide area network 124 to a data store 115. The data store 115 may search for media content consistent with the content descriptive information provided via the search query. The data store 115 may return one or more search results to the media recorder 102 for display to the user via a search results display.

In a particular embodiment, the search results may include one or more unscheduled programs. That is, the search results may include at least one program that is not identified in the currently published electronic program guide available at the media recorder 102. The search results display may allow the user to request recording of the unscheduled program when the program becomes available. The wish list module 118 may also allow the user to configure the recording of the unscheduled program. For example, the user may configure the recording request to record the unscheduled program at a time when it becomes available even if a fee is associated with accessing the program, to record the unscheduled program when it becomes available if no fee is associated with the recording, to alert the user when the unscheduled program becomes available, or any combination thereof. The wish list module 118 may add the desired program to a wish list by generating and storing wish list data identifying the desired program and user specified configuration information. When new electronic program guide information becomes available at the media recorder 102, the wish list module 118 may automatically search the new electronic program guide information to determine whether one or more programs identified in wish list have been scheduled for distribution. When a program in the wish list is scheduled for distribution, the wish list module 118 may interact with other modules, such as the recording module 116, to schedule recording of the desired program based on the user specified configuration information.

In a particular embodiment, the media distribution system 125 may include or be associated with a content scheduling element 128. The content scheduling element 128 may include a computer system adapted to assist a content provider with scheduling media content for distribution. For example, the content scheduling element 128 may be adapted to recommend content for distribution or to schedule the content for distribution. The content scheduling element 128 may include processing logic 132 and a memory 134 accessible to the processing logic 132. The content scheduling element 128 may also include a network interface 130 adapted to facilitate communications between the content scheduling element 128 and the wide area network 124.

The content scheduling element 128 may include a data analysis module 136. The data analysis module 136 may be adapted to receive wish list data from a plurality of media recorders, such as the media recorder 102. In a particular embodiment the media recorder 102 may include a reporting module 120. The reporting module 120 may generate a report including wish list data associated with the media recorder 102. The reporting module 120 may send the wish list data via the wide area network 124 to the content scheduling element 128. The data analysis module 136 may analyze wish list data received from a plurality of media recorders to estimate the popularity of particular programming. For example, the data analysis module 136 may determine a ranking of various programs relative to one another based on the wish list data.

In a particular embodiment, the data analysis module 136 may take into account user specified configuration information associated with programs identified in the wish list data to determine the popularity of a particular program. For example, the wish list data from each media recorder may indicate whether the user specified configuration associated with the program includes a record/alert instruction. Record/alert instructions may include, for example, an instruction to record the program if no fee is required, an instruction to record the program even if a fee is required, an instruction to provide an alert when the program becomes available, another record/alert instruction or any combination thereof. The popularity of a particular program may be estimated by weighting a count of each occurrences of a program according to the type of record/alert instruction associated with the occurrence. Each type of record/alert instruction may be associated with a different weighting value. For example, an occurrence of a particular program in a first wish list that is associated with an instruction to record the program even if a fee is required may indicate a higher level of interest in the program than an occurrence of the particular program in a second wish list that is associated with an instruction to record the program if no fee is required. In another example, an occurrence of a particular program in a first wish list that is associated with an instruction to record the program even if a fee is required may indicate a higher level of interest in the program than an occurrence of the particular program in a second wish list that is associated with an instruction to provide an alert when the program becomes available. Thus, each occurrence of the particular program in the wish list data may be weighted according to a weighting value related to an instruction associated with the occurrence to determine viewer interest in the particular program.

In a particular embodiment, the user computer 126 is adapted to communicate with the media recorder 102 to search for or schedule recording of media content at the media recorder 102. For example, a user may search for a particular program, schedule recording of the particular program, or add a program to the wish list remotely using the user computer 126.

Figure 2:
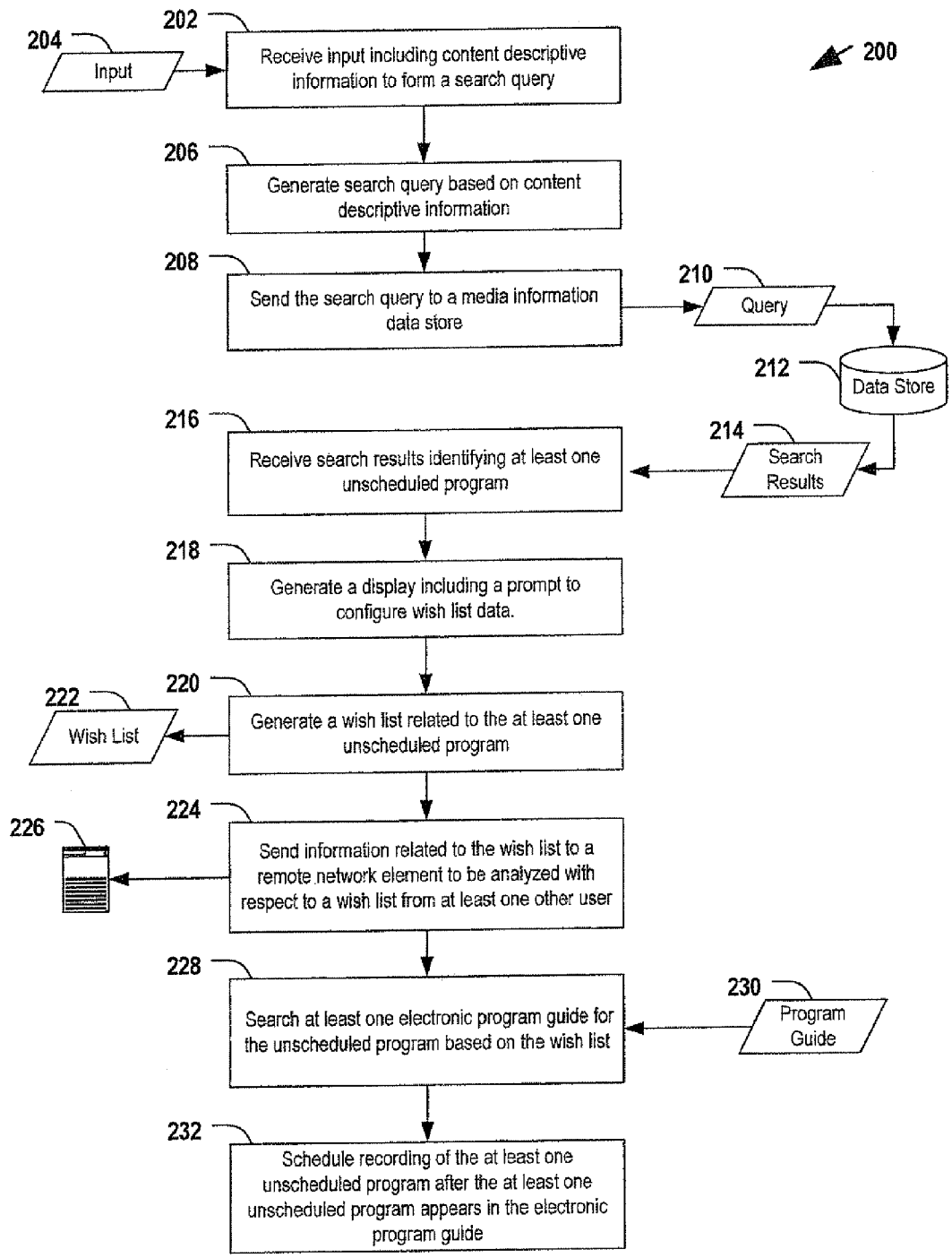
FIG. 2 is a flow chart of a first particular embodiment of a method of processing program wish list data.

FIG. 2 depicts a first particular embodiment of a method of processing program wish list data and is generally designated 200. The method 200 includes, at 202, receiving input 204 including content descriptive information to form a search query. The content descriptive information may include, for example, a title of a program, names of one or more people associated with the program (e.g., actors, directors, producers), text descriptive of the program (e.g., subject matter of the program, plot elements, awards received, genre, year of release), other content descriptive information, or any combination thereof. The method 200 may also include, at 206, generating a search query 210 based on the content descriptive information and, at 208, sending the search query 210 to a media information data store 212. The search query 210 may include a request that the media information data store 212 identify program content related to or consistent with the content descriptive information. The media information data store 212 may include information related to programs scheduled for distribution and information related to programs that are not scheduled for distribution, e.g., unscheduled programs. The method 200 may also include, at 216, generating a display including search results 214 related to the search query 210. The search results 214 may include at least one unscheduled program. That is, at least one program that is not identified in a currently available program guide may be included in the search results 214.

The method 200 may also include, at 218, generating a display including a prompt to configure wish list data. The prompt to configure the wish list data may include, for example, an option to schedule a recording of a selected program when the program becomes available, an option to schedule a recording of a selected program when the program becomes available without a fee, an option to schedule a recording of a selected program when the program becomes available with a fee, an option to indicate how long to leave the program on the wish list an option to alert the user when the program becomes available for further scheduling of the recording, or any combination thereof. The method 200 may also include, at 220, generating a wish list 222 related to the at least one unscheduled program.

In a particular embodiment, the method 200 also includes, at 224, sending information related to the wish list 222 to a remote network element 226 to be analyzed with respect to wish lists from other users to assist with program scheduling or distribution. The remote network element 226 may select programming via a content distribution network based on the wish lists. In another particular embodiment the remote network element 226 may recommend programs for broadcast based on the wish lists. In yet another particular embodiment, the remote network element 226 may estimate user interest in particular programs based on the wish lists. For example, the remote network element 226 may rank particular programs with respect to one another based on the wish lists.

In a particular embodiment, the method 200 may include, at 228, searching at least one electronic program guide for the unscheduled program based on the wish list 222. For example, an electronic program guide may be updated periodically and distributed via a content distribution network. After the electronic program guide is distributed, the electronic program guide may be compared to the wish list 222 to determine whether one or more programs identified in wish list 222 are scheduled for distribution based on the electronic programming guide. When a particular program identified in a wish list 222 is identified in the electronic program guide, the method 200 may also include, at 232, scheduling recording of the particular program.

Figure 3:
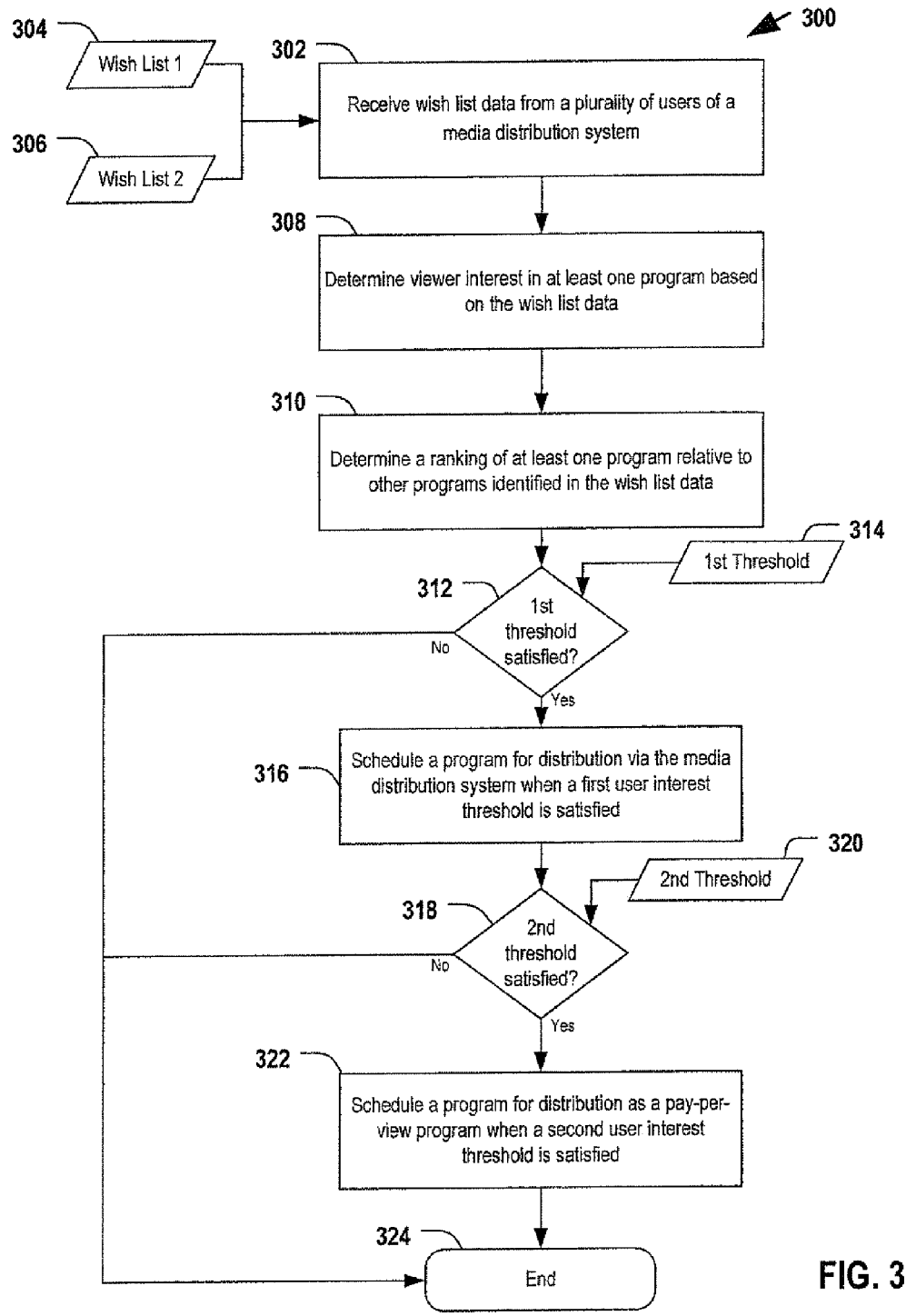
FIG. 3 is a flow chart of a second particular embodiment of a method of processing program wish list data.

FIG. 3 depicts a second particular embodiment of a method of processing program wish list data and is generally designated 300. The method 300 includes, at 302, receiving wish list data from a plurality of users of a media distribution system. For example, the wish list data may include data related to a first wish list 304 from a first user and data related to a second wish list 306 from a second user. The wish list data may identify one or more programs that are not scheduled for transmission based on published program guides available to the plurality of users.

The method 300 also includes, at 308, determining viewer interest in at least one program based on the wish list data. For example, viewer interest in at least one program may be determined by identifying programs included in a plurality of the wish lists, such as the first wish list 304 and the second wish list 306. The method 300 may also include, at 310, determining a ranking of at least one program relative to other programs identified in the wish list data. For example, a count of the number of occurrence of each program in the wish list data may be used to rank the programs. In another example, a weighted count of the number of occurrence of each program may be used. The number of occurrence of each program may be weighted based on user configuration information associated with each program. For example, the user configuration information may include instructions such as an instruction to record the program if no fee is required, an instruction to record the program even if a fee is required or an instruction to alert the user when the program becomes available. A different weighting may be associated with each instruction. Each occurrence of a program in the wish list data may be weighted by the weighting associated with the user configuration information to rank the programs relative to one another.

In a particular embodiment, the method 300 includes, at 312, determining whether a first viewer interest threshold 314 is satisfied based on the wish list data. When viewer interest in a particular program satisfies the first viewer interest threshold 314, the method 300 includes, at 316, scheduling the particular program for distribution via the media distribution system. In a particular illustrative embodiment, the first viewer interest threshold 314 may be related to any manner of estimating viewer interest in a program. For example, a count of the number of occurrences of the program in the wish list data may be used to estimate the viewer interest in the program. In another example, a weighted count of the number of occurrences of the program in the wish list data may be used to estimate the viewer interest in the program. In still another example, only particular types of occurrences of the program in the wish list data may be counted to estimate viewer interest in the program. To illustrate, only occurrences of the program that are associated with an instruction to record the program even if there is a fee associated with accessing the program may be counted. In yet another example, the first viewer interest threshold 314 may be satisfied by a highest ranking portion of programs identified in the wish list data. For example, the top ten most requested programs, the top 10 percent of the requested programs, or some other portion of the requested programs may satisfy the first viewer interest threshold 314. If the first viewer threshold 314 is not satisfied, the method 300 may terminate, at 324.

The method 300 may also include, at 318, determining whether a second viewer interest threshold 320 is satisfied based on the wish list data. When viewer interest in a particular program satisfies the second viewer interest threshold 320, the method 300 includes, at 322, scheduling the particular program for distribution via the media distribution system as a per-per-view program. When the second viewer interest threshold 320 is not satisfied, the method 300 terminates, at 324. In a particular illustrative embodiment, the second viewer interest threshold 320 may be related to any manner of estimating viewer interest in a program. For example, a count of the number of occurrences of the program in the wish list data may be used to estimate the viewer interest in the program. In another example, a weighted count of the number of occurrences of the program in the wish list data may be used to estimate the viewer interest in the program. In still another example, only particular types of occurrences of the program in the wish list data may be counted to estimate viewer interest in the program. To illustrate, only occurrences of the program that are associated with an instruction to record the program even if there is a fee associated with accessing the program may be counted. In yet another example, the second viewer interest threshold 320 may be satisfied by a highest ranking portion of programs identified in the wish list data. For example, the top one or two most requested programs, the top 5 percent of the requested programs, or some other portion of the requested programs may satisfy the second viewer interest threshold 320.

Figure 4:
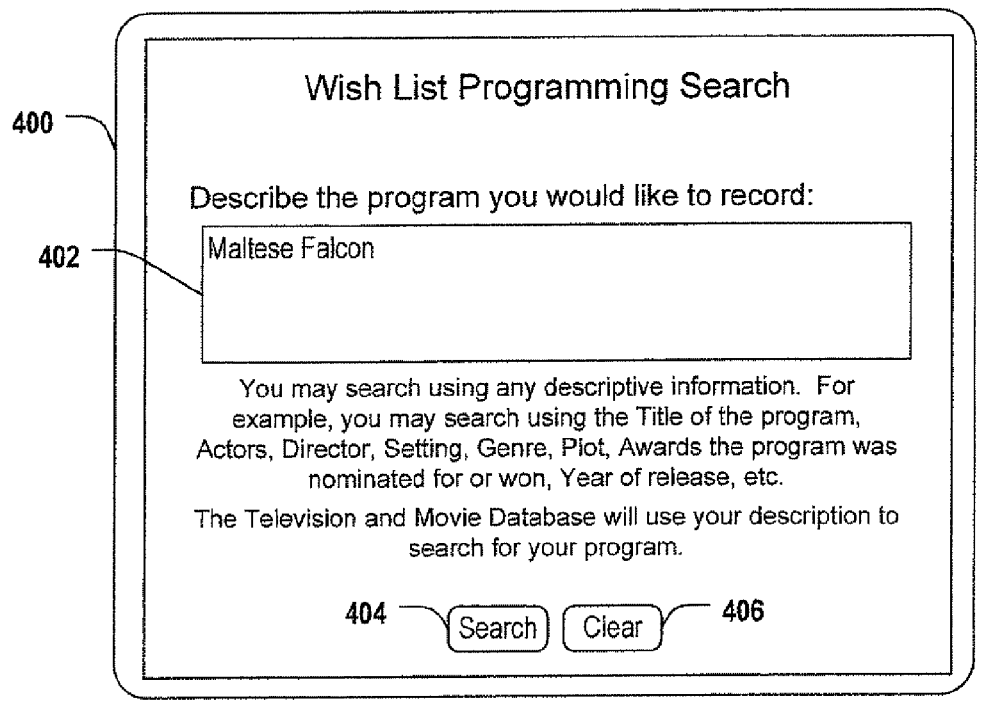
FIG. 4 is an illustration of a first particular embodiment of a user interface display for processing program wish list data.

FIG. 4 depicts a first particular embodiment of a user interface display 400 for processing program wish list data. In a particular embodiment the user interface display 400 may be presented via a display device, such as a television or a computer display device. The user interface display 400 is adapted to allow a user to search programming to generate a wish list. The user interface display 400 includes a search input box 402. The search input box 402 allows a user to provide content descriptive information to generate a search query to identify desired programming. The user interface display 400 also includes a search input selector 404 and a clear input selector 406. The search input selector 404 allows the user to indicate that the system should generate a search query based on provided content descriptive information to search for desired programming. The clear input selector 406 allows the user to clear the search input box 402 to remove the content descriptive information.

In the particular example illustrated in FIG. 4, the search input box 402 includes the text "Maltese Falcon." Thus, the user has provided content descriptive information indicating a desire to search for programming described by the terms "Maltese Falcon." The content descriptive information may include a title of a program, an actor, a director, a setting, a genre, a plot element, an award associated with the program, a year of release of the program, other descriptive information, or any combination thereof. Based on the provided content descriptive information, a query may be generated and sent to a media information data store to identify programing that is consistent with or otherwise matches the content descriptive information.

Figure 5:
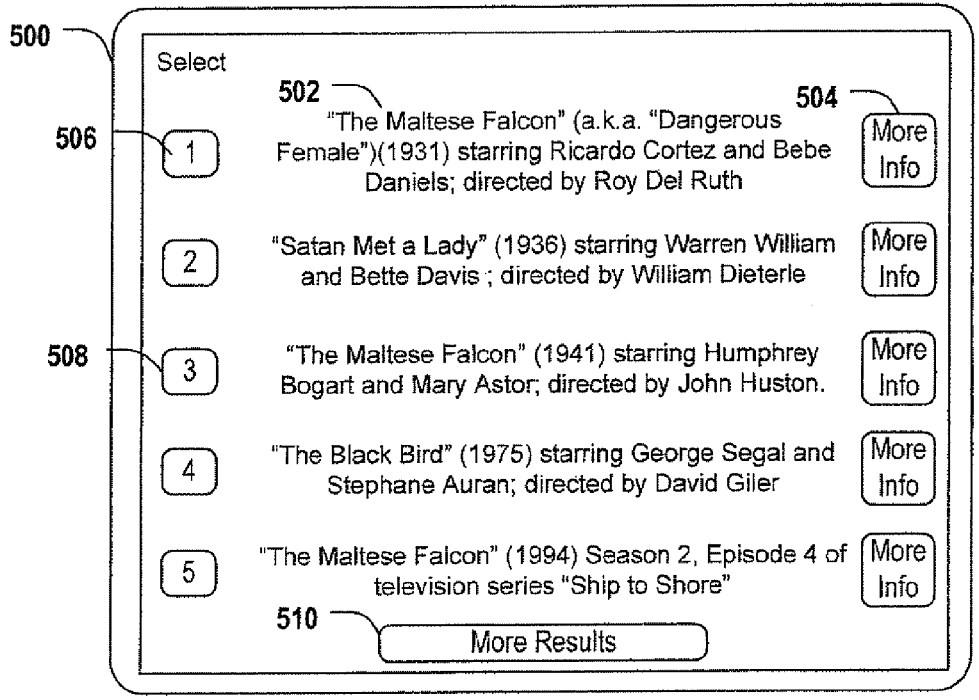
FIG. 5 is an illustration of a second particular embodiment of a user interface display for processing program wish list data.

FIG. 5 depicts a second particular embodiment of a user interface display 500 for processing program wish list data. The user interface display 500 includes search results generated in response to a search query, such as a search query generated based on content descriptive information provided via the user interface display 400 depicted in FIG. 4. The user interface display 500 includes a plurality of search results. Each search result includes descriptive information, a more information selector, and a selection input selector. The descriptive information 502 may provide, for example, a title of the program, a year of release, actors associated with the program, directors associated with the program, genre, and so forth. In the particular example illustrated in FIG. 5, the search results are relate to the content descriptive information "Maltese Falcon;" and thus, the descriptive information 502 associated with the first search result identifies a movie titled "The Maltese Falcon." A first selection input selector 506 is associated with the search result. By selecting the first selection input selector 506, the user may indicate a desire to add the particular program identified in the first search result to a wish list. A more information selector 504 may also be associated with the first search result. Selecting the more information selector 504 may cause more information about the particular program content to be displayed. The search result may include more results than can be displayed via the user interface display 500 at one time, so the user interface display 500 may include a more results input selector 510. The more results input selector 510 may cause the current list of search results to be replaced with a subsequent list of search results based on the search query.

Figure 6:
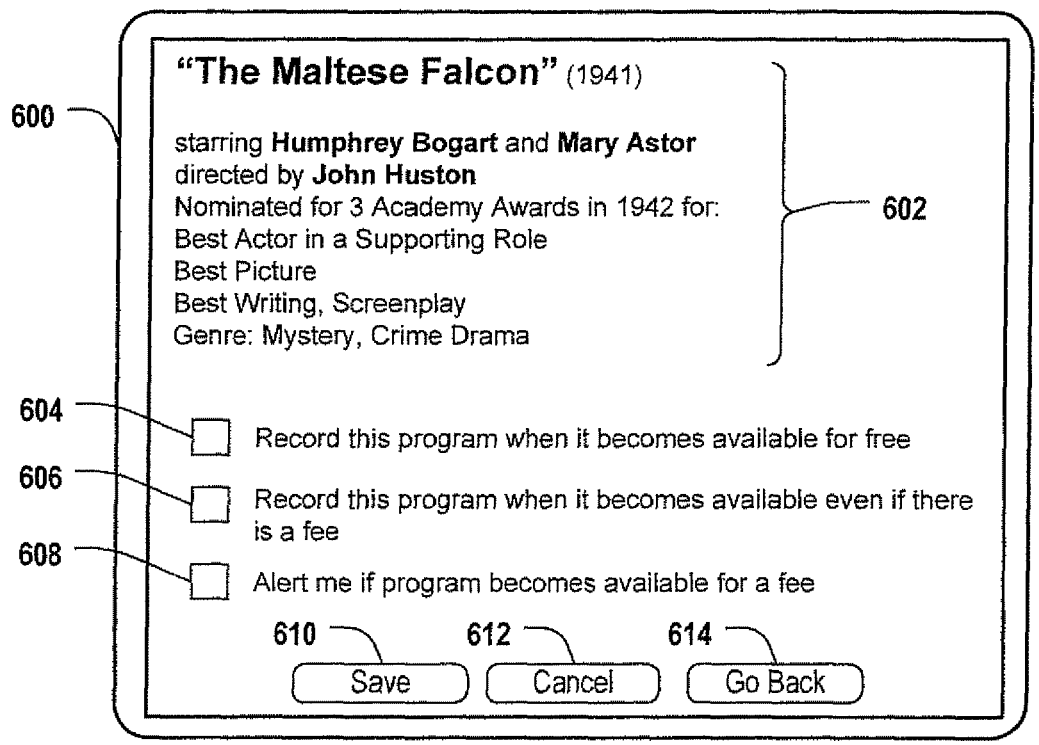
FIG. 6 is an illustration of a third particular embodiment of a user interface display for processing program wish list data.

FIG. 6 depicts a third particular embodiment of a user interface display 600 for processing program wish list data. The user interface display 600 may be presented in response to a user selecting a selection input selector of a search results user interface display, such as the user interface display 500 depicted in FIG. 5. In the particular example illustrated in FIG. 6, the selection input selector 508 associated with the 1941 release of the Maltese Falcon string Humphrey Bogart and Mary Astor has been selected. In another particular embodiment, the user interface display 600 is presented in response to the user selecting a more information selector associated with a search result of a particular search results item user interface.

The user interface display 600 includes more detailed descriptive information 602 associated with the particular program. Additionally the user interface display 600 may include a plurality of user input mechanisms to configure a wish list. For example, the user interface display 600 may include an input 604 indicting a user selectable option to record the program when it becomes available without a fee. The user interface display 600 may also include an input 606 indicating a user selectable option to record the program when it becomes available even if there is a fee. In a particular embodiment, the user interface display 600 may also include an input (not shown) to set a maximum upper limit for a fee associated with a program. If the program becomes available for a fee less than the maximum established limit, the program may be recorded automatically. However, if the program becomes available for a fee more than the established upper limit the user may be alerted that the program is available. The user interface display 600 may also include an input 608 indicating a user selectable option to be alerted if the program becomes available for a fee. The user interface display 600 also includes a save input selector 610 to save the wish list record, a cancel input selector 612 to cancel the wish list record, and a go back input selector 614 to go back to a previous user interface display. In a particular embodiment, the go back input selector 614 returns the user to the user interface display 500 including search results or the user interface display 400 including a wish list programming search interface.

Figure 7:
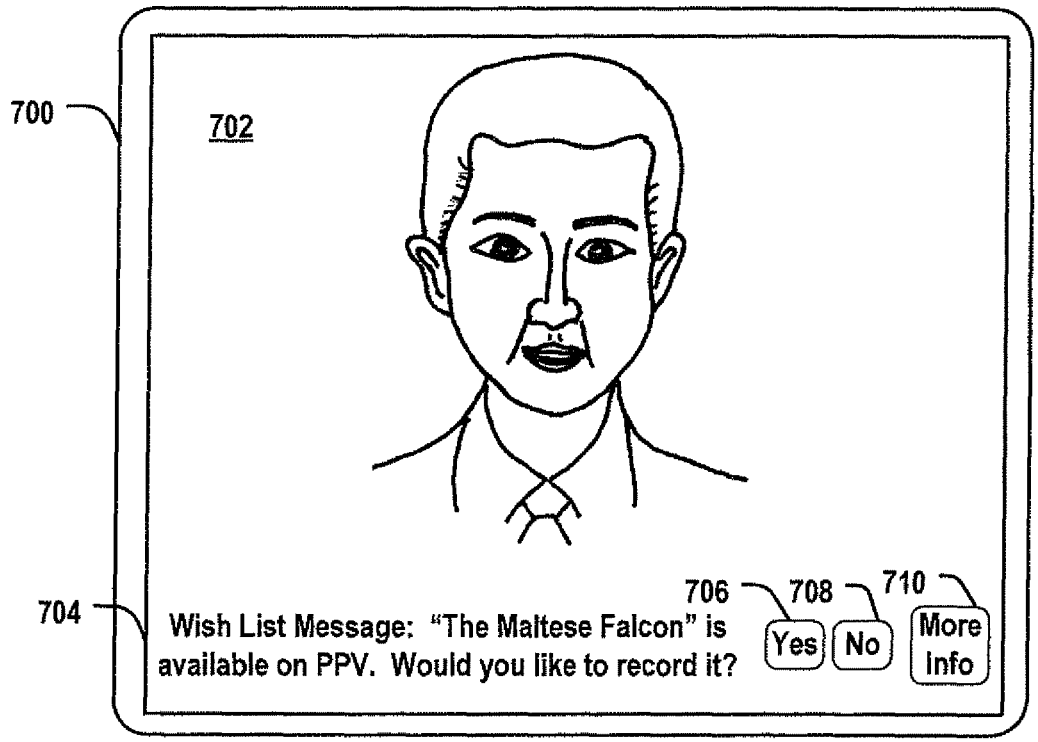
FIG. 7 is an illustration of a fourth particular embodiment of a user interface display for processing program wish list data.

FIG. 7 depicts a fourth particular embodiment of a user interface display 700 for processing programming wish list data. The user interface display 700 includes program content 702 displayed at a display device, such as a television. The program content may be supplemented by a wish list message 704. The wish list message 704 may indicate that a program identified in a wish list is available for recording. In a particular embodiment, the wish list message 704 may indicate that the program is available for recording for a fee, as may be the case for a pay per view program, or video on demand program. In a particular embodiment, the wish list message 704 may include one or more user selectable input mechanisms to allow the user to determine whether to record the program or not. For example, by selecting a yes input 706, the user may indicate a desire to record the program identified in the wish list message. By selecting a no input 708, the user may indicate a desire to not record the program identified in the wish list message. By selecting a more information input 710, the user may indicate a desired to be provided with additional information, such as more identifying information of the particular program, costs associated with recording the particular program, when the program will be available for recording, other information, or any combination thereof.

Embodiments described herein may free a user from having to remember to search for and select programming that is being broadcast. For example, if a user is interested in viewing a particular program, such as "The Maltese Falcon," rather than periodically checking to see if this program is being broadcast by searching an electronic programming guide for the program, the user may be able to establish a wish list that automatically searches for desired programs. The wish list may also automatically record desired programs as they become available if the desired program meets certain conditions. The programs identified in the wish list may include, for example, classic programs which are not broadcast regularly, such as "The Maltese Falcon;" new releases which are still in cinematic release and which are not available via a television media distribution system; sporting events that are upcoming but not identified in available published electronic program guides, such as the Super Bowl; or other programming content of interest to a user that is not identified in a published and available electronic programming guide; and so forth.

Additionally, embodiments described herein may allow content providers or media distribution system operators to schedule programs for distribution based on viewer interest in the programs. Rather than relying on historical ratings information, polling or other sampling techniques, programs may be scheduled based on queries received directly from individual viewers.

Figure 8:
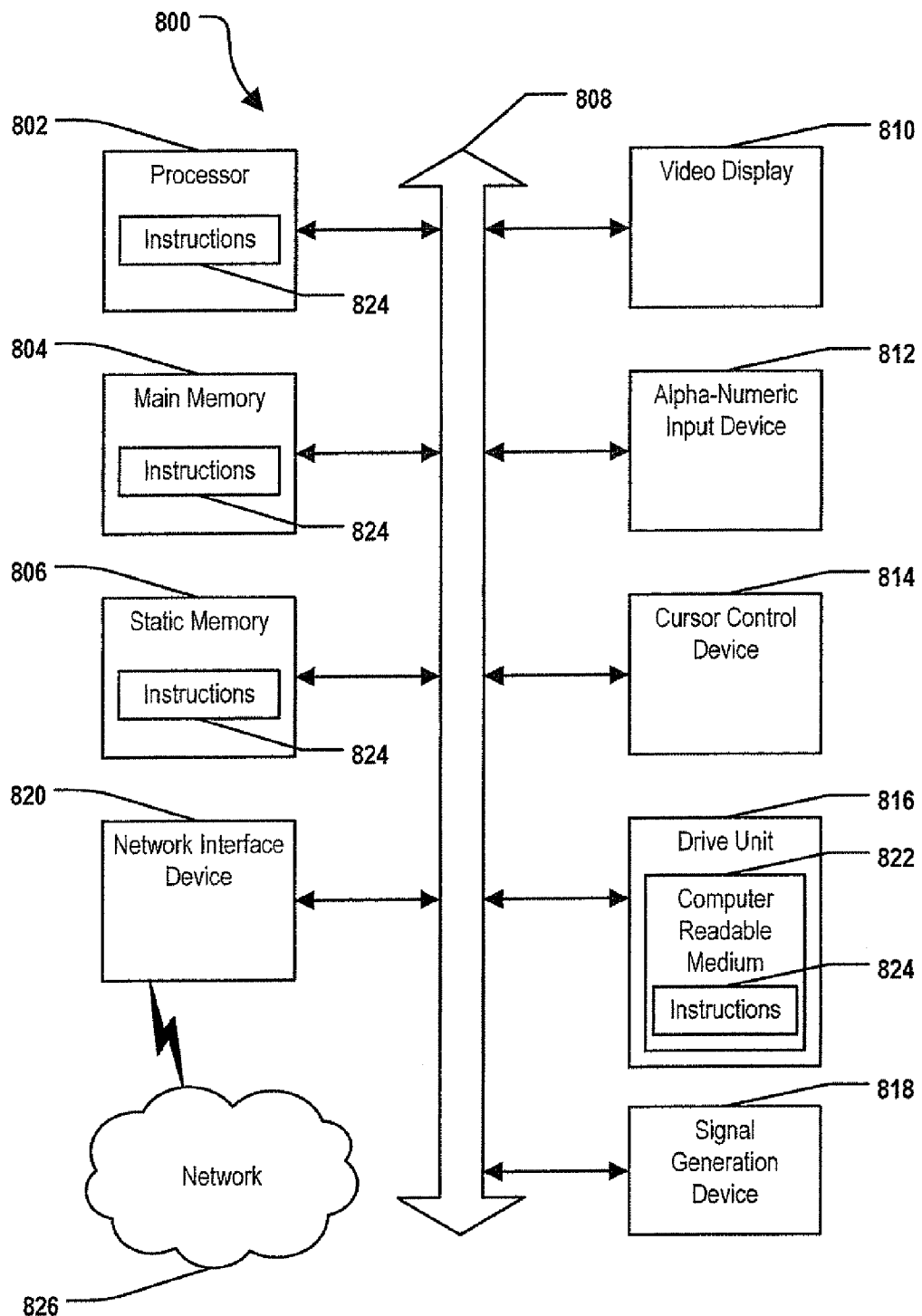
FIG. 8 is a block diagram of an illustrative embodiment of a computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the computer system 800 may include or be included within any one or more of the media distribution systems, content scheduling elements, data stores, user computers, media recorders, display devices, or network elements illustrated in FIGS. 1 and 2.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (DA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment the computer system 800 can be implemented using electronic devices that provide voice, video or data communication. Further, while a single computer system 800 is illustrated, the term "system" shall also be taken to include any collection of systems or sub-systems that individually or jointly execute a set or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806, that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard or a remote control device, and a cursor control device 814, such as a mouse. The computer system 800 can also include a disk drive unit 816, a signal generation device 818, such as a speaker, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

generating a display including search results related to a search query based on received input that includes content descriptive information, wherein the search results identify an unscheduled program;

generating a first wish list related to the unscheduled program, wherein generating the first wish list includes prompting a first user to configure the first wish list by specifying a program option of a plurality of program options for the unscheduled program, wherein the plurality of program options comprises:

a notification option to notify the first user of scheduling changes for the unscheduled program associated with the first wish list;

a fee option that specifies fee criteria for recording a second unscheduled program of the first wish list; and a time option that indicates a period of time that the unscheduled program is to remain on the first wish list; and sending information related to the first wish list to a remote network element for analysis of the first wish list with respect to a second wish list associated with a second user, wherein the analysis includes determining user interest for a particular unscheduled program in wish list data including the first wish list and the second wish list, and wherein the user interest for the particular unscheduled program is determined as a weighted count of occurrences of the particular unscheduled program in the wish list data, wherein each occurrence of the particular unscheduled program in the wish list data is weighted based on a corresponding type of program option associated with the occurrence, each type of program option associated with a particular weight value.

2. The method of claim 1, wherein the unscheduled program comprises a program not identified on an available program schedule.

3. The method of claim 1, further comprising:
automatically searching an electronic program guide for the unscheduled program associated with the first wish list, wherein automatically searching is based on the program option specified in the first wish list; and
scheduling recording of the unscheduled program after the unscheduled program is located in the electronic program guide based on automatically searching the electronic program guide.

4. The method of claim 1, further comprising sending the search query to a media information data store to identify program content related to the content descriptive information, wherein the media information data store includes information related to programs scheduled for broadcast and information related to programs not scheduled for broadcast.

5. The method of claim 1, wherein the unscheduled program is related to a particular movie in cinematic release when the first wish list is generated.

6. The method of claim 1, further comprising sending the display to a display device.

7. The method of claim 1, wherein the content descriptive information includes information related to a title of a program.

8. The method of claim 1, wherein the content descriptive information includes information related to a person associated with a program.

9. The method of claim 1, wherein the content descriptive information includes information related to subject matter associated with a program.

10. The method of claim 1, wherein the notification option is a first type of program option that is associated with a first weight value, the fee option is a second type of program option that is associated with a second weight value, and the time option is a third type of program option that is associated with a third weight value, and wherein the first weight value, the second weight value, and the third weight value are not equal.

11. A system comprising:
a processor; and
memory accessible to the processor, the memory including instructions executable by the processor to cause the processor to perform operations comprising:
generating first wish list data related to a program not scheduled for transmission, wherein the program is not listed in a published program guide when the first wish list data is generated, wherein generating the first wish list data includes prompting a user to configure the first wish list data by specifying a program option of a plurality for the program not scheduled for transmission, wherein the plurality of program options include:
a notification option to notify the user of scheduling changes for the program not scheduled for transmission;
a fee option that specifies fee criteria for recording a second program not scheduled for transmission, the second program included in the first wish list data; and
a time option that indicates a period of time that the program not scheduled for transmission is to remain in the first wish list data; and
reporting information related to the first wish list data to a remote network element for analysis of the first wish list data with respect to second wish list data associated with another user, wherein the analysis includes determining user interest for a particular program not scheduled for transmission that is included in a set of wish list data including the first wish list data and the second wish list data, and wherein the user interest for the particular program is determined as a weighted count of occurrences of the particular program in the set of wish list data, wherein each occurrence of the particular program in the set of wish list data is weighted based on a corresponding type of program option associated with the occurrence, each type of program option associated with a particular weight value.

12. The system of claim 11, wherein the published program guide identifies media content available to be distributed via an Internet Protocol Television system.

13. The system of claim 11, wherein the operations further comprise searching a media information database to identify the program not scheduled for transmission based on information provided by the user.

14. The system of claim 12, wherein, when the user interest satisfies a user interest threshold, the particular program is scheduled for distribution via the Internet Protocol Television system and the published program guide is updated to indicate that the particular program is available for viewing.

15. The system of claim 14, wherein the plurality of program options include an option to record the program not scheduled for transmission when the program not scheduled for transmission is available for access without a fee.

16. The system of claim 14, wherein the plurality of program options include an option to receive a notification when the program not scheduled for transmission is available for a fee.

17. A processor-readable storage device comprising processor-readable instructions that are executable by a processor to cause the processor to perform operations comprising:
generating a display including search results related to a search query based on received input that includes content descriptive information, wherein the search results identify an unscheduled program;
generating first wish list data related to the unscheduled program, wherein generating the first wish list data includes prompting a user to configure the first wish list data by specifying a program option of a plurality of program options for the unscheduled program, and wherein the plurality of program options include:
a notification option to notify the user of scheduling changes for the unscheduled program;
a fee option that specifies fee criteria for recording a second unscheduled program, the second unscheduled program included in the first wish list data;
a time option that indicates a period of time that the unscheduled program is to remain in the first wish list data; and
sending information related to the first wish list data to a remote network element for analysis of the first wish list data with respect to second wish list data associated with another user, wherein the analysis includes determining user interest for a particular unscheduled program that is in a set of wish list data including the first wish list data and the second wish list data, and wherein the user interest for the particular unscheduled program is determined as a weighted count of occurrences of the particular unscheduled program in the set of wish list data, wherein each occurrence of the particular unscheduled program in the set of wish list data is weighted based on a corresponding type of program option associated with the occurrence, each type of program option associated with a particular weight value.

18. The processor-readable storage device of claim 17, wherein the analysis includes ranking a first unscheduled program in the set of wish list data relative to a second unscheduled program in the set of wish list data, the ranking based on the user interest for the first unscheduled program relative to the user interest for the second unscheduled program.

19. The processor-readable storage device of claim 17, wherein the operations further comprises displaying one or more recommended programs responsive to the first wish list data.

20. The processor-readable storage device of claim 17, wherein the operations further comprise sending the display to a display device.

21. The processor-readable storage device of claim 17, wherein the plurality of program options include an option to record the unscheduled program when the unscheduled program is available for access without a fee.

* * * * *